United States Patent
Endo

(10) Patent No.: US 10,489,239 B2
(45) Date of Patent: Nov. 26, 2019

(54) MULTIPLEXING SYSTEM, MULTIPLEXING METHOD, AND COMPUTER PROGRAM PRODUCT

(71) Applicants: KABUSHIKI KAISHA TOSHIBA, Minato-ku, Tokyo (JP); TOSHIBA DIGITAL SOLUTIONS CORPORATION, Kawasaki-shi, Kanagawa (JP)

(72) Inventor: Kotaro Endo, Tokyo (JP)

(73) Assignees: KABUSHIKI KAISHA TOSHIBA, Tokyo (JP); TOSHIBA DIGITAL SOLUTIONS CORPORATION, Kawasaki-Shi (JP)

(*) Notice: Subject to any disclaimer, the term of this patent is extended or adjusted under 35 U.S.C. 154(b) by 101 days.

(21) Appl. No.: 15/906,061

(22) Filed: Feb. 27, 2018

(65) Prior Publication Data

US 2018/0189131 A1 Jul. 5, 2018

Related U.S. Application Data

(63) Continuation of application No. PCT/JP2015/075514, filed on Sep. 8, 2015.

(51) Int. Cl.
*G06F 11/07* (2006.01)
*G06F 11/18* (2006.01)

(52) U.S. Cl.
CPC ...... *G06F 11/0793* (2013.01); *G06F 11/0709* (2013.01); *G06F 11/0751* (2013.01); *G06F 11/182* (2013.01); *G06F 11/184* (2013.01)

(58) Field of Classification Search
CPC ...... G06F 11/07; G06F 11/0709; G06F 11/09; G06F 11/14; G06F 15/16
(Continued)

(56) References Cited

U.S. PATENT DOCUMENTS

| 5,598,529 A | 1/1997 | Garay et al. |
| 5,923,830 A | 7/1999 | Fuchs et al. |

(Continued)

FOREIGN PATENT DOCUMENTS

| JP | 2534430 | 9/1996 |
| JP | 2001-526809 | 12/2001 |

(Continued)

OTHER PUBLICATIONS

International Search Report and Written Opinion for International Patent Application No. PCT/JP2015/075514 dated Dec. 22, 2015, 11 pages.

(Continued)

*Primary Examiner* — Kamini B Patel
(74) *Attorney, Agent, or Firm* — Amin, Turocy & Watson, LLP

(57) ABSTRACT

According to an embodiment, a multiplexing system includes servers. Each server includes a memory, a processing unit, a decision controller, and a restoring unit. The memory is configured to store internal data. The processing unit is configured to output, as first data, deterministic data or the nondeterministic data. The deterministic data is uniquely determined by an operation based on input data and the internal data having not yet been processed. When the processing unit cannot determine deterministic output it outputs the nondeterministic data. The decision controller is configured to select either the first data output from the each server or the first data output from another server, and decide the selected first data as second data. The restoring unit is configured to, when the second output data is the nondeterministic data, restore the internal data to a state of the internal data having not yet been processed.

8 Claims, 13 Drawing Sheets

(58) Field of Classification Search
USPC .......................................................... 714/19
See application file for complete search history.

(56) References Cited

U.S. PATENT DOCUMENTS

| | | | | |
|---|---|---|---|---|
| 6,799,222 | B1* | 9/2004 | Endo | ........................ H04L 47/10 |
| | | | | 709/205 |
| 7,272,632 | B2 | 9/2007 | Endo | |
| 2002/0194276 | A1* | 12/2002 | Endo | .................... G06F 11/1482 |
| | | | | 709/205 |
| 2004/0078618 | A1* | 4/2004 | Moser | ...................... G06F 9/526 |
| | | | | 714/3 |
| 2009/0080355 | A1* | 3/2009 | Song | ........................ H04L 47/10 |
| | | | | 370/312 |
| 2009/0259789 | A1* | 10/2009 | Kato | ........................ G06F 13/28 |
| | | | | 710/308 |
| 2011/0019673 | A1* | 1/2011 | Fernandez Gutierrez | ................... |
| | | | | H04L 12/185 |
| | | | | 370/390 |
| 2017/0004029 | A1* | 1/2017 | Endo | ........................ G06F 11/18 |

FOREIGN PATENT DOCUMENTS

| | | |
|---|---|---|
| JP | 3655263 | 6/2005 |
| JP | 2007-316787 | 12/2007 |
| WO | 2014/207893 | 12/2014 |

OTHER PUBLICATIONS

Zookeeper, http://zookeeper.apache.org/doc/current/zookeeperInternals.html, Search Date May 7, 2015.

Ohara, et al. "A Note on Constructing Distributed Asynchronous TMR Systems", IEICE Technical Report, Jun. 13, 2003, vol. 103, No. 134, pp. 9-14.

* cited by examiner

MULTIPLEXING SYSTEM, MULTIPLEXING METHOD, AND COMPUTER PROGRAM PRODUCT

CROSS-REFERENCE TO RELATED APPLICATIONS

This application is a continuation of PCT international application Ser. No. PCT/JP2015/075514 filed on Sep. 8, 2015, the entire contents of which are incorporated herein by reference.

FIELD

Embodiments described herein relate generally to a multiplexing system, a multiplexing method, and a computer program product.

BACKGROUND

A multiplexing system in which same operations are performed across a plurality of computers in a duplicative manner has already been put to practical use as a method for enhancing the reliability of the computers. In a multiplexing system, even if any one of the computers outputs an erroneous result due to malfunctioning, the erroneous result is compared with the normal results output from the other computers, thereby enabling detection or correction of the error. With that, the reliability of the entire system can be enhanced.

As far as the methods for implementing a multiplexing system are concerned, a method is known in which ordered multicasting is used. For example, an input ordered multicasting operation is known in which sets of target input data for processing are sent to a plurality of computers and the processing order of the sets of input data is decided. As a result of performing the input ordered multicasting operation, each computer can process the same sets of input data in the same processing order.

In a multiplexing system in which ordered multicasting is implemented, the operations to be multiplexed need to be deterministic in nature. Herein, "being deterministic" implies the property by which input data and internal data having not yet been processed enable unique determination of output data and internal data having been processed. Because of this property, the contents of the operations to be multiplexed remain consistent, and the output data array becomes identical across a plurality of computers.

In the conventional technology, the operations to be multiplexed are limited to the operations having deterministic nature. That is because, if the operations to be multiplexed are not deterministic in nature, then the normal result is not unique and thus the output result of each computer may vary even when there is no malfunctioning. That is, in the conventional technology, if the operations to be multiplexed are not deterministic in nature, then the multiplexing system cannot guarantee consistency.

DETAILED DESCRIPTION

According to an embodiment, a multiplexing system includes a plurality of server devices. Each of the server devices includes a memory and one or more hardware processors configured to function as a processing unit, a decision controller, a restoring unit, a re-execution controller, and an output unit. The memory is configured to store internal data. The processing unit is configured to output, as first output data, deterministic output data or the nondeterministic output data. The deterministic output data is uniquely determined by an operation that is based on input data and based on the internal data that has not yet been processed. When the processing unit cannot determine deterministic output it outputs the nondeterministic output data. The decision controller is configured to select either the first output data output from the each server device or the first output data output from one of the other server devices, and decide the selected first output data as second output data. The restoring unit is configured to, when the second output data is the nondeterministic output data, restore the internal data stored in the memory, to a state of the internal data that has not yet been processed. The re-execution controller is configured to, when the second output data is deterministic output data and when the second output data does not match the first output data output from the each server device, cause the each server device to repeatedly perform the operation either until the second output data matches the first output data that has been re-decided or until a re-execution count becomes equal to or greater than a threshold value. The output unit is configured to output the second output data either when the second output data is the nondeterministic output data or when the second output data is deterministic output data and the second output data matches the first output data that has been re-decided.

Exemplary embodiments of a multiplexing system, a multiplexing method, and a computer program product are described below in detail with reference to the accompanying drawings.

First Embodiment

Figure 1:
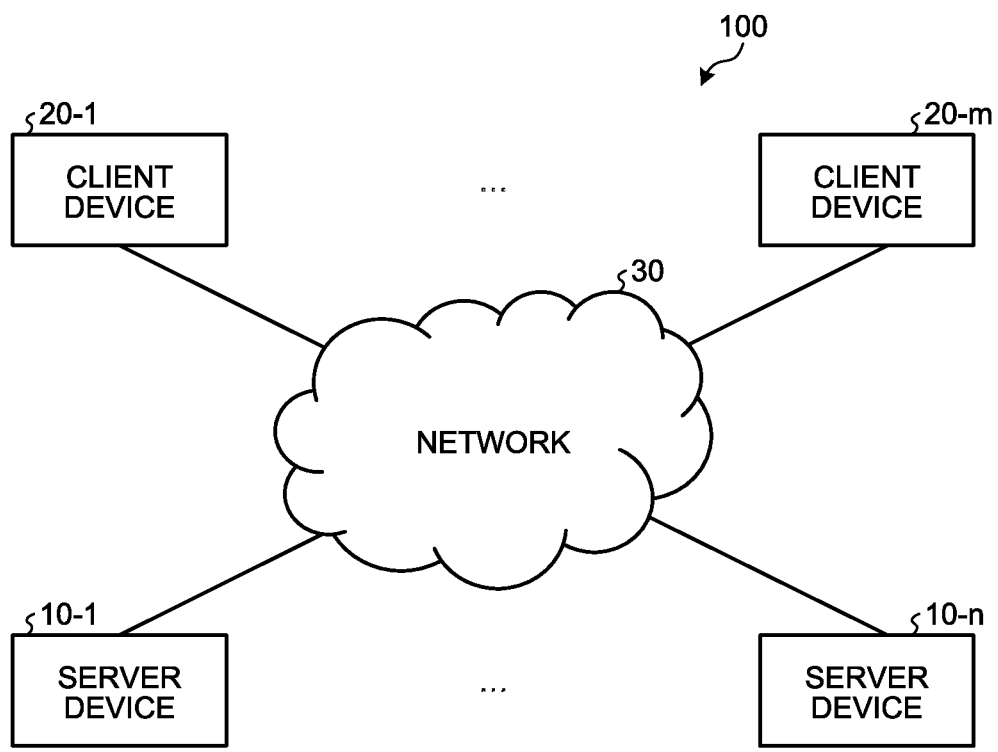
FIG. 1 is a diagram illustrating an exemplary configuration of a multiplexing system according to a first embodiment.

FIG. 1 is a diagram illustrating an exemplary configuration of a multiplexing system 100 according to a first embodiment. The multiplexing system 100 according to the first embodiment includes server devices 10-1 to 10-$n$ (where n is an integer equal to or greater than four), client devices 20-1 to 20-$m$ (where m is an integer equal to or greater than one), and a network 30. In the following explanation, when the server devices 10-1 to 10-$n$ need not be distinguished from each other, they are simply referred to as the server devices 10. In an identical manner, when the client devices 20-1 to 20-$m$ need not be distinguished from each other, they are simply referred to as the client devices 20.

The server devices 10 and the client devices 20 are connected to each other via the network 30. As far as the communication method among the devices is concerned, either wired communication, or wireless communication, or a combination of wired communication and wireless communication can be implemented.

Figure 2:
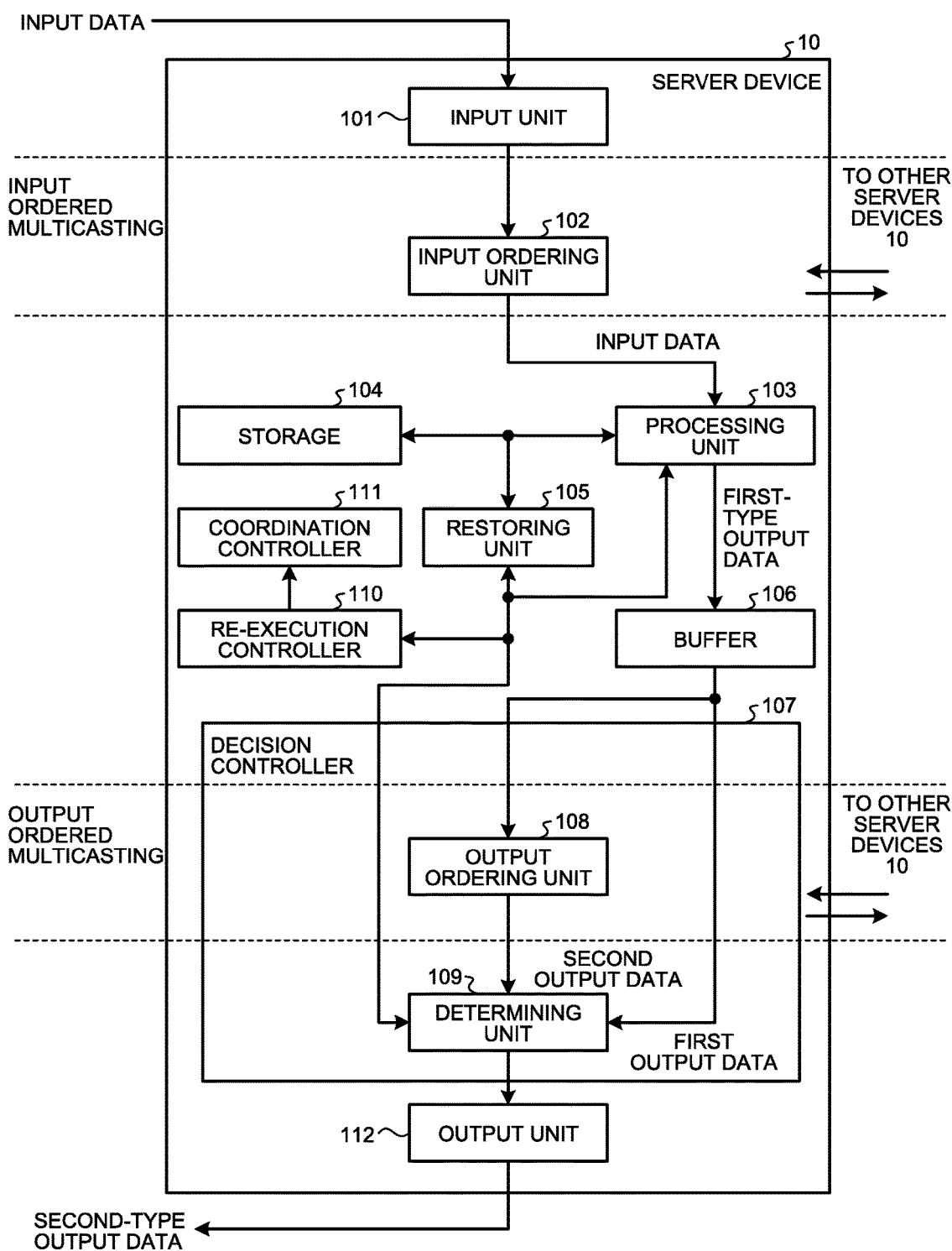
FIG. 2 is a diagram illustrating an exemplary configuration of a server device according to the first embodiment.

FIG. 2 is a diagram illustrating an exemplary configuration of the server device 10 according to the first embodiment. The server device 10 according to the first embodiment includes an input unit 101, an input ordering unit 102, a processing unit 103, a storage 104, a restoring unit 105, a buffer 106, a decision controller 107, a re-execution controller 110, a coordination controller 111, and an output unit 112. The decision controller 107 further includes an output ordering unit 108 and a determining unit 109.

The input unit 101 receives input data from the client device 20 via the network 30, and inputs the input data to the input ordering unit 102.

Upon receiving the input data from the input unit 101, the input ordering unit 102 sends the input data to the other server devices 10 other than the own server device 10. Moreover, the input ordering unit 102 receives, from the other server devices 10 other than the own server device 10, input data that has been received by the other server devices 10 other than the own server device 10. Then, the input ordering unit 102 decides on the order of a plurality of sets of input data according to the input ordered multicasting. Given below is the explanation of the input ordered multicasting.

Figure 3:
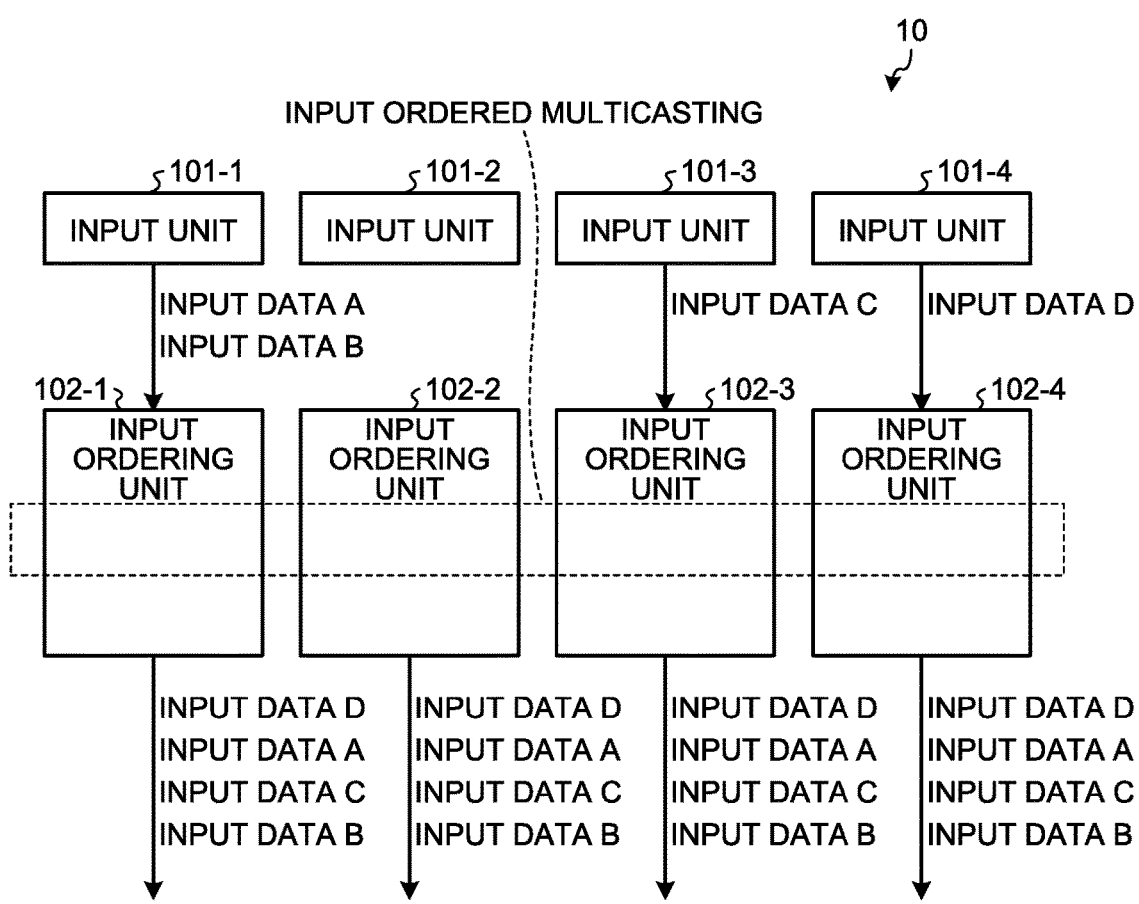
FIG. 3 is a diagram illustrating an example of input ordered multicasting according to the first embodiment.

FIG. 3 is a diagram illustrating an example of the input ordered multicasting according to the first embodiment. FIG. 3 illustrates an example in which input data A and input data B are input from the input unit 101-1 to the input ordering unit 102-1 in the server device 10-1; input data C is input from the input unit 101-3 to the input ordering unit 102-3 in a server device 10-3; and input data D is input from the input unit 101-4 to the input order unit 102-4 in a server device 10-4.

In the input ordered multicasting operation, the sets of input data that is input to the input unit 101 of the own server device 10 is sent to the other server devices 10 other than the own server device 10, and order numbers indicating the processing order of the sets of input data are decided. In each server device 10, the input ordering unit 102 associates the input data and the order numbers. Thus, that association becomes identical in each server device 10. FIG. 3 illustrates an example in which the processing order of the sets of input data is decided in the order of the input data D, the input data A, the input data C, and the input data B. As far as the operation for deciding the processing order of the sets of input data is concerned, it is possible to implement the method disclosed in Japanese Patent No. 3655263, for example.

Returning to the explanation with reference to FIG. 2, the input ordering unit 102 sequentially inputs the sets of input data, which have been decided according to input ordered multicasting, to the processing unit 103. Upon receiving each input data from the input ordering unit 102, the processing unit 103 inputs first output data, which is obtained as a result of processing the input data, to the buffer 106 (a first output data output operation). More particularly, the processing unit 103 either inputs deterministic output data or inputs the nondeterministic output data as the first output data to the buffer 106.

The deterministic output data represents output data that is uniquely decided as a result of performing operations based on the input data and the internal data, which has not yet been processed (herein, "not-yet-processed internal data"), stored in the storage 104. The nondeterministic output data represents output data which abstractly expresses the fact that the output data is not uniquely decided as a result of performing operations based on the input data and the internal data stored in the storage 104. The nondeterministic output data has no values, and does not coincide with the deterministic output data.

Given below is the explanation of an exemplary operation in which the nondeterministic output data arises. For example, during an operation, if there happens to be a shortage of resources thereby making it impossible to continue with the operation, error processing that is performed for cancelling the operation is considered to be the operation in which the nondeterministic output data arises. That is because of the fact that the shortage of resources (for example, insufficient memory) is dependent on external factors such as the status of other programs being concurrently run in the same computer device.

More particularly, for example, in the case of allocating the resources using a system call to the operating system, there is a possibility that determinacy is not maintained. That is because an ordinary operating system does not have determinacy related to the allocation of resources, and the allocation of resources is sometimes successful or sometimes unsuccessful depending on the execution status of other programs. That is, in regard to multiplexed operations, there may be a shortage of resources in particular computers but there may be sufficient resources in other computers. Moreover, if the program execution position at which the shortage of resources occurs is different among the server devices 10, then the consistency of the internal data, which has been processed (herein, "processed internal data") in the storage 104, may also be broken.

Regarding this issue, in the conventional technology, a data processing program secures determinacy by not directly allocating the resources every time from the operating system. For example, a resource processing program having determinacy allocates and pools, in advance, a predetermined amount of resources from the operating system; and the data processing program obtains the resources via the resource management program and thus secures determinacy.

Although error processing is different from the flow of normal processing and needs to be dealt with in an appropriate manner, there can be error processing that outputs deterministic output data. For example, when the value of the input data is not within a predetermined range, error processing meant for outputting a message to notify that the value of the input data is not within the predetermined range is decided based only on the input data. Hence, that error processing can be treated as an operation that outputs deterministic output data.

The error processing that outputs deterministic output data can be considered to be an normal operation, because the identical error processing is performed in all computers with consistency. On the other hand, for example, in the case of a failure such as malfunctioning (the byzantine fault) in a computer, only the particular computer outputs erroneous output data (or does not output the output data at all).

In the explanation of the first embodiment, it is assumed that the number n of the server devices 10, which are included in the multiplexing system 100, satisfies n>3b; where b represents the number of server devices 10 in which the byzantine fault is allowed.

The restoring unit 105 holds the internal data, which is stored in the storage 104, before the internal data in the storage 104 is processed by the processing unit 103 based on the input data. Then, if second output data (described later) is the nondeterministic output data, the restoring unit 105 receives a restoration request from the determining unit 109 (described later). Upon receiving the restoration request, the restoring unit 105 restores the internal data, which is stored in the storage 104, to the not-yet-processed state thereof. Moreover, when the second output data (described later) is deterministic output data and when the first output data does not match the second output data, the restoring unit 105 receives a restoration request from the determining unit 109 (described later). Upon receiving a restoration request, the restoring unit 105 restores the internal data, which is stored in the storage 104, to the not-yet-processed state thereof.

The buffer 106 is used to store the first output data received from the processing unit 103. The output ordering unit 108 sends the first output data, which is stored in the buffer 106 of the own server device 10, to the other server devices 10 other than the own server device 10. Moreover, the output ordering unit 108 receives first output data from the other server devices 10 other than the own server device 10.

Then, the output ordering unit 108 performs an output ordered multicasting operation. The following is the explanation of the output ordered multicasting operation. In the output ordered multicasting operation, regarding each order number, identical first output data stored in the buffer 106 of b+1 or more number of server devices 10 is selected and decided as second output data. At that time, the output ordered multicasting operation is performed so as to ensure that the selected second output data matches in each server device.

In a normal server device 10 in which the byzantine fault has not occurred; only either deterministic output data, which has been uniquely decided using a deterministic operation, or the nondeterministic output data can serve as the first output data. Since n>3b is the condition of operation, attention is to be paid to the fact that either the sets of deterministic output data or the sets of the nondeterministic output are equal to or greater than b+1 in number, and that the candidates for the second output data are invariably present.

More particularly, since n>3b is the condition of operation; the normal server devices 10, excluding the server devices 10 in the byzantine fault has occurred, exist at least equal to 2b+1 in number. If x represents the number of server devices 10 that output the nondeterministic output data as the first output data and if y represents the number of server devices 10 that output deterministic output data as the first output data, then x+y≥2b+1 holds true. Thus, at least either x or y is equal to or greater than b+1.

In the case in which both x and y are equal to or greater than b+1, either one of x and y can be selected. Therefore, the output ordered multicasting operation needs to be performed so as to ensure that the selection is identical in each server device. In regard to that, as a specific method for implementation, in a same manner to the case of the input ordered multicasting, it is possible to implement the method disclosed in Japanese Patent No. 3655263, for example.

The output ordering unit 108 inputs the second output data along with the order number to the determining unit 109.

Upon receiving the second output data and the order number from the output ordering unit 108, the determining unit 109 reads from the buffer 106 the first output data associated to the order number, and performs a finalization operation.

Case in which Second Output Data is the Nondeterministic Output Data

When the second output data is the nondeterministic output data; the determining unit 109 issues a restoration request to the restoring unit 105 for restoring the internal data, which is stored in the storage 104, to the not-yet-processed state thereof, and inputs the second output data to the output unit 112. Upon receiving the second output data from the determining unit 109, the output unit 112 outputs the second output data.

Case in which Second Output Data is Deterministic Output Data and in which First Output Data does not Match Second Output Data When the second output data is deterministic output data and when the first output data does not match the second output data, the determining unit 109 issues a re-execution control request to the re-execution controller for re-execution of the operations performed by the processing unit 103.

Upon receiving the re-execution control request from the determining unit 109, the re-execution controller 110 issues a restoration request to the restoring unit 105 and issues a re-execution request to the processing unit 103. The processing unit 103 again performs operations based on the input data and the not-yet-processed internal data restored by the restoring unit 105, and again decides the first output data of the own server device 10. Herein, either until the second output data and the re-decided first output data match each other or until the re-execution count becomes equal to or greater than a threshold value, the re-execution controller 110 makes the processing unit 103 of the own server device 10 perform operations based on the input data and the not-yet-processed internal data.

As a result of the operations performed again by the processing unit 103, when the first output data matches the second output data, the re-execution controller 110 inputs a processing result matching notification to the determining unit 109 indicating that the processing results has a match. Upon receiving the processing result matching notification from the re-execution controller 110, the determining unit 109 finalizes the output of the second output data from the output unit 112. Then, the determining unit 109 outputs the second output data to the output unit 112. Upon receiving the second output data from the determining unit 109, the output unit 112 outputs the second output data.

Meanwhile, if the re-execution count becomes equal to or greater than the threshold value, then the re-execution controller 110 issues a coordination termination request to the coordination controller 111 for terminating the coordination with the other server devices 10 other than the own server device 10. Upon receiving the coordination termination request from the re-execution controller 110, the coordination controller 111 terminates the coordination with the other server devices 10 other than the own server device 10. That is, the multiplexing system 100 regards that the concerned server device 10 is malfunctioning and does not use that server device 10 in multiplexing.

Given below is the explanation of a multiplexing method according to the first embodiment.

Figure 4:
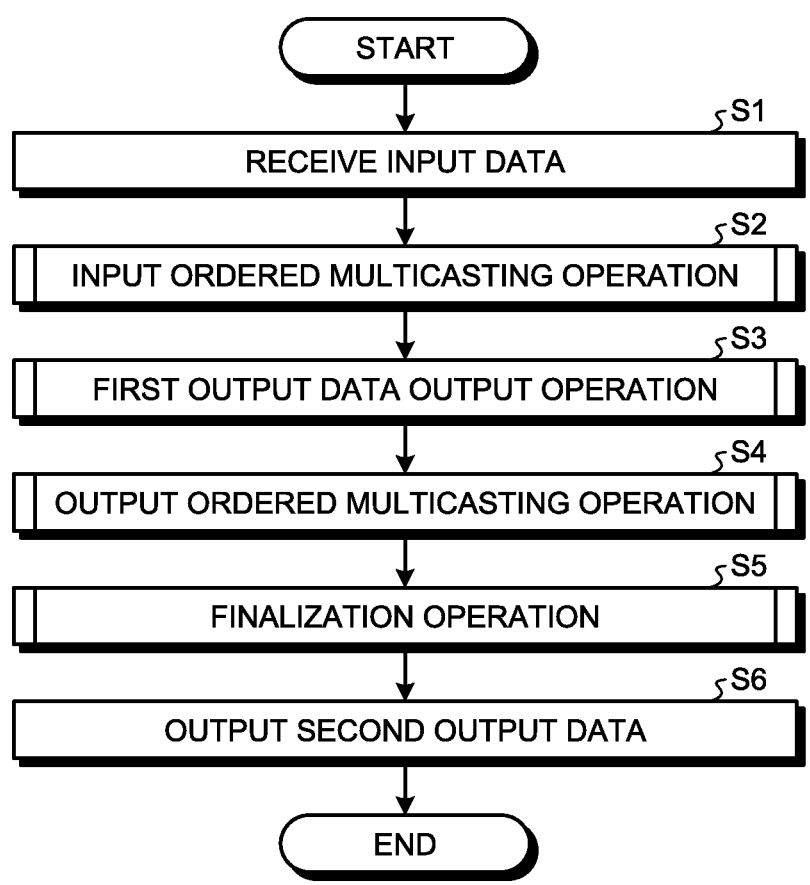
FIG. 4 is a flowchart for explaining an example of a multiplexing method according to the first embodiment.

FIG. 4 is a flowchart for explaining an example of the multiplexing method according to the first embodiment. Firstly, the input unit 101 receives input data from the client device 20 via the network 30 (Step S1). Then, the input ordering unit 102 performs the input ordered multicasting operation and decides the processing order of a plurality of sets of input data (Step S2). Subsequently, the processing unit 103 performs the first output data output operation and outputs the first output data (Step S3). Then, the output ordering unit 108 performs the ordered multicasting operation and decides on second output data based on the sets of first output data having the same order number (Step S4). Subsequently, the determining unit 109 performs the finalization operation (Step S5). Regarding the details of the finalization operation, the explanation is given later with reference to FIG. 5. Then, the output unit 112 outputs the second output data that has been finalized in the finalization operation performed at Step S5 (Step S6).

Given below is the explanation of the finalization operation performed at Step S5.

Figure 5:
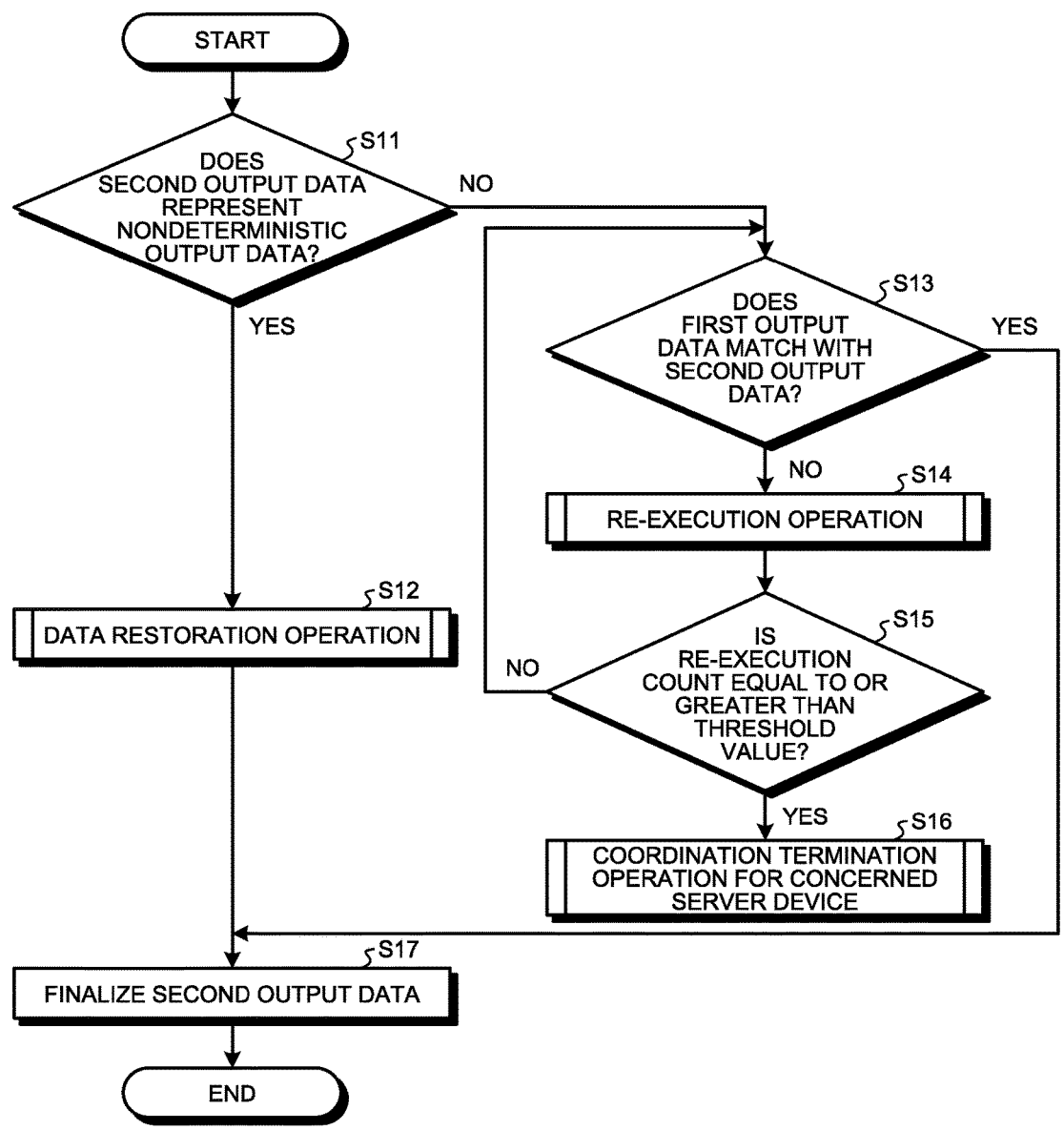
FIG. 5 is a flowchart for explaining an example of a finalization operation according to the first embodiment.

FIG. 5 is a flowchart for explaining an example of the finalization operation according to the first embodiment. Firstly, the determining unit 109 determines whether or not the second output data is the nondeterministic output data (Step S11).

If the second output data is the nondeterministic output data (Yes at Step S11), then the restoring unit 105 performs a restoration operation for restoring the internal data, which is stored in the storage 104, to the not-yet-processed state thereof (Step S12). Then, the determining unit 109 finalizes the second output data as the output of the output unit 112 (Step S17).

If the second output data is not the nondeterministic output data (No at Step S11), that is, if the second output data is deterministic output data; then the determining unit 109 further determines whether or not the first output data and the second output data match each other (Step S13).

If the first output data and the second output data match (Yes at Step S13), then the determining unit 109 finalizes the second output data as the output of the output unit 112 (Step S17).

On the other hand, if the first output data and the second output data do not match (No at Step S13); then the re-execution controller 110 performs a re-execution operation (Step S14). More particularly, the re-execution controller 110 issues a restoration request to the restoring unit 105 and issues a re-execution request to the processing unit 103. Then, the processing unit 103 again performs operations based on the input data and based on the not-yet-processed internal data restored by the restoring unit 105; and again outputs the first output data.

Subsequently, the determining unit 109 determines whether or not the re-execution count has reached or exceeded a threshold value (Step S15). If the re-execution count has reached or exceeded the threshold value (Yes at Step S15), then the coordination controller 111 performs a coordination termination operation for terminating the coordination with the other server devices 10 other than the own server device 10 (Step S16). However, if the re-execution count is smaller than the threshold value (No at Step S15), then the system control returns to Step S13 and the determining unit 109 again determines whether or not the first output data and the second output data match.

Meanwhile, although omitted from the explanation given above, the order number is assigned to the input data, the first output data, as well as the second output data. The order number for the input data is assigned using input ordered multicasting. Regarding the first output data, the order number of the input data that has been used in the operation of outputting the concerned first output data is assigned to the concerned first output data. The output ordered multicasting receives the first output data that is assigned with the same order number as the order number of the ordered multicasting managed therein, and assigns that order number to the concerned second output data that has been decided.

As explained earlier with reference to FIGS. 4 and 5, regarding each order number, each server device 10 performs a series of operations including the input ordered multicasting operation (Step S2), the first output data output operation (Step S3), the output ordered multicasting operation (Step S4), and the finalization operation (Step S5). At that time, the processing unit 103 needs to perform operations according to the order of a series of order numbers.

Meanwhile, regarding a particular order number, the operations performed by the processing units 103 need not be always executed simultaneously across a plurality of server devices 10. For example, it is possible to have a case in which the processing unit 103 of a particular server device 10 is behind in performing operations and thus performs operations of older order numbers as compared to the other server devices 10. In such a case too, as long as the input ordered multicasting and the output ordered multicasting satisfies the condition of operation, the consistency of multiplexing is maintained. Moreover, as part of the operations in the input ordered multicasting and the output ordered multicasting, a certain degree of synchronization is implicitly achieved among the computers. The degree of synchronization is determined depending on the manner of implementation of the input ordered multicasting and the output ordered multicasting.

Given below is the explanation about operation examples of the multiplexing method according to the first embodiment.

Figure 6:
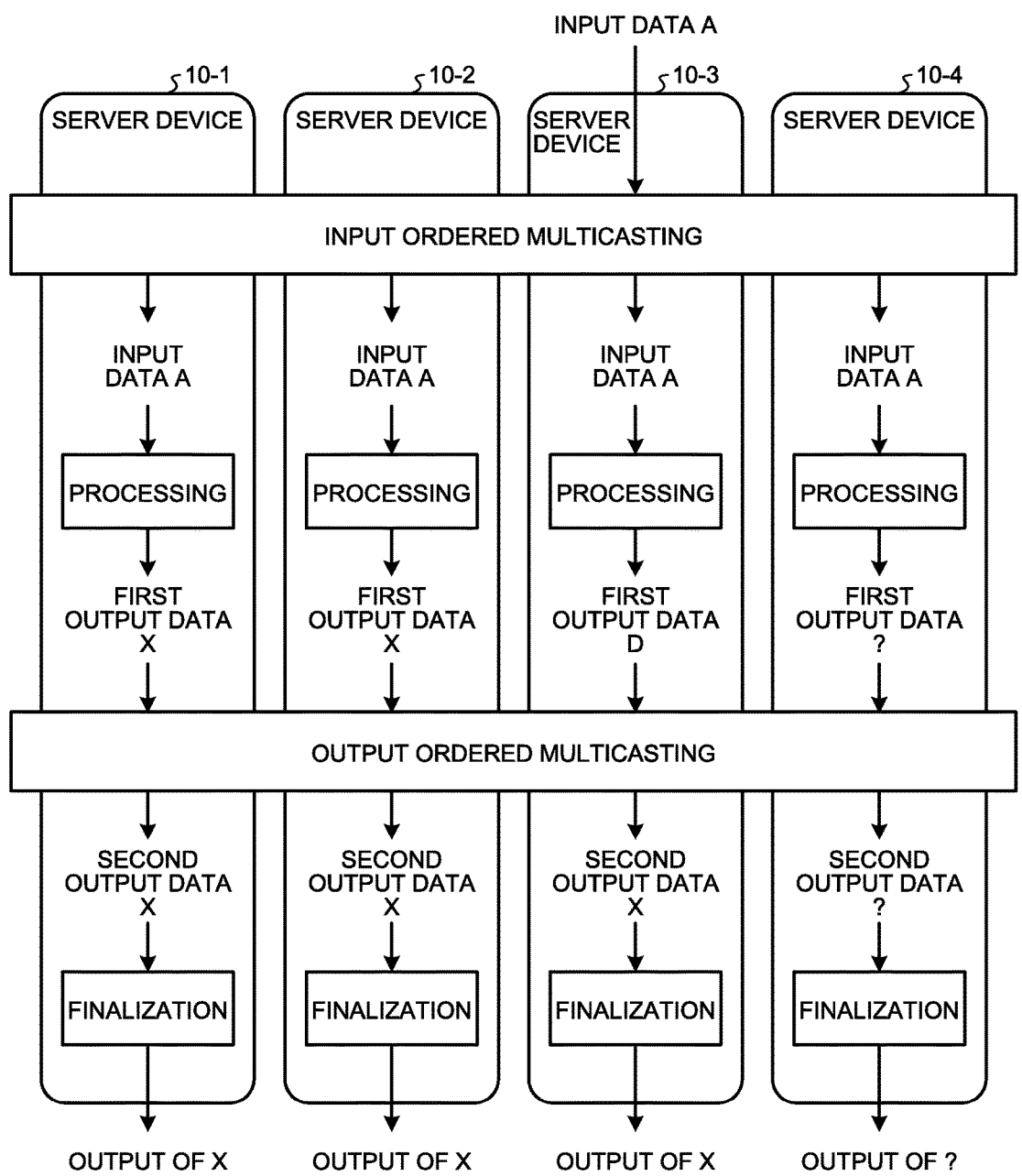
FIG. 6 is a diagram illustrating a first operation example of the multiplexing method according to the first embodiment.

FIG. 6 is a diagram illustrating a first operation example of the multiplexing method according to the first embodiment. FIG. 6 illustrates an example in which the number n of the server devices 10 is equal to four and the number b of occurrences of the byzantine fault is equal to one (i.e., the byzantine fault has occurred in the server device 10-4). In the server device 10-3, when the input unit 101 receives the input data A, the input ordering unit 102 sends the input data A to the server devices 10-1, 10-2, and 10-4. In the server device 10-4, the operations are in an unstable condition because of the byzantine fault. In the server devices 10-1 to 10-3, the input ordering unit 102 associates the same order number to the input data A.

In the server devices 10-1 to 10-3, the processing unit 103 performs operations based on the input data A and based on the not-yet-processed internal data stored in the corresponding storage 104, and outputs first output data. In the example illustrated in FIG. 6, the server devices 10-1 and 10-2 output the nondeterministic output data X as first output data; the server device 10-3 outputs deterministic output data D as first output data; and the server device 10-4 in which the byzantine fault has occurred outputs indeterminate output data ? as first output data. Each first output data is stored in the buffer 106 of the corresponding server device 10.

In the server devices 10-1 to 10-3, the output ordering unit 108 decides on the nondeterministic output data X as the second output data. That is because the nondeterministic output data X is stored in the buffer 106 of the server devices 10-1 and 10-2, and satisfies the selection condition of the output ordered multicasting because b+1=2 holds true.

In the server devices 10-1 to 10-3, the determining unit 109 performs the operations at Steps S11, S12, and S17 illustrated in the flowchart in FIG. 5 and finalizes the second output data X as the output of the output unit 112.

That is, in the server devices 10-1 to 10-3, the output unit 112 outputs the nondeterministic output data X as the second output data. Hence, in the server devices 10-1 to 10-3, the restoring unit 105 restores the internal data, which is stored in the storage 104, to the state thereof before being processed by the processing unit 103. In the server device 10-4, the operations are in an unstable condition because of the byzantine fault.

As a result, even if the server devices 10-1 and 10-2 perform a nondeterministic operation (for example, failure in allocating the resources using a system call to the operating system) and even if the server device 10-3 performs a deterministic operation (successful processing), the consistency of multiplexing is maintained. That is, in the server devices 10-1 to 10-3, the internal data stored in the storage 104 returns to the same state as the state when the input data A is not processed, and the nondeterministic output data X indicating that state is output from the server devices 10-1 to 10-3.

Meanwhile, in the multiplexing operation according to the conventional technology, in the case illustrated in FIG. 6, it is regarded that malfunctioning has occurred in the server devices 10-1 and 10-2, and thus the multiplexing operation cannot be continued.

Figure 7:
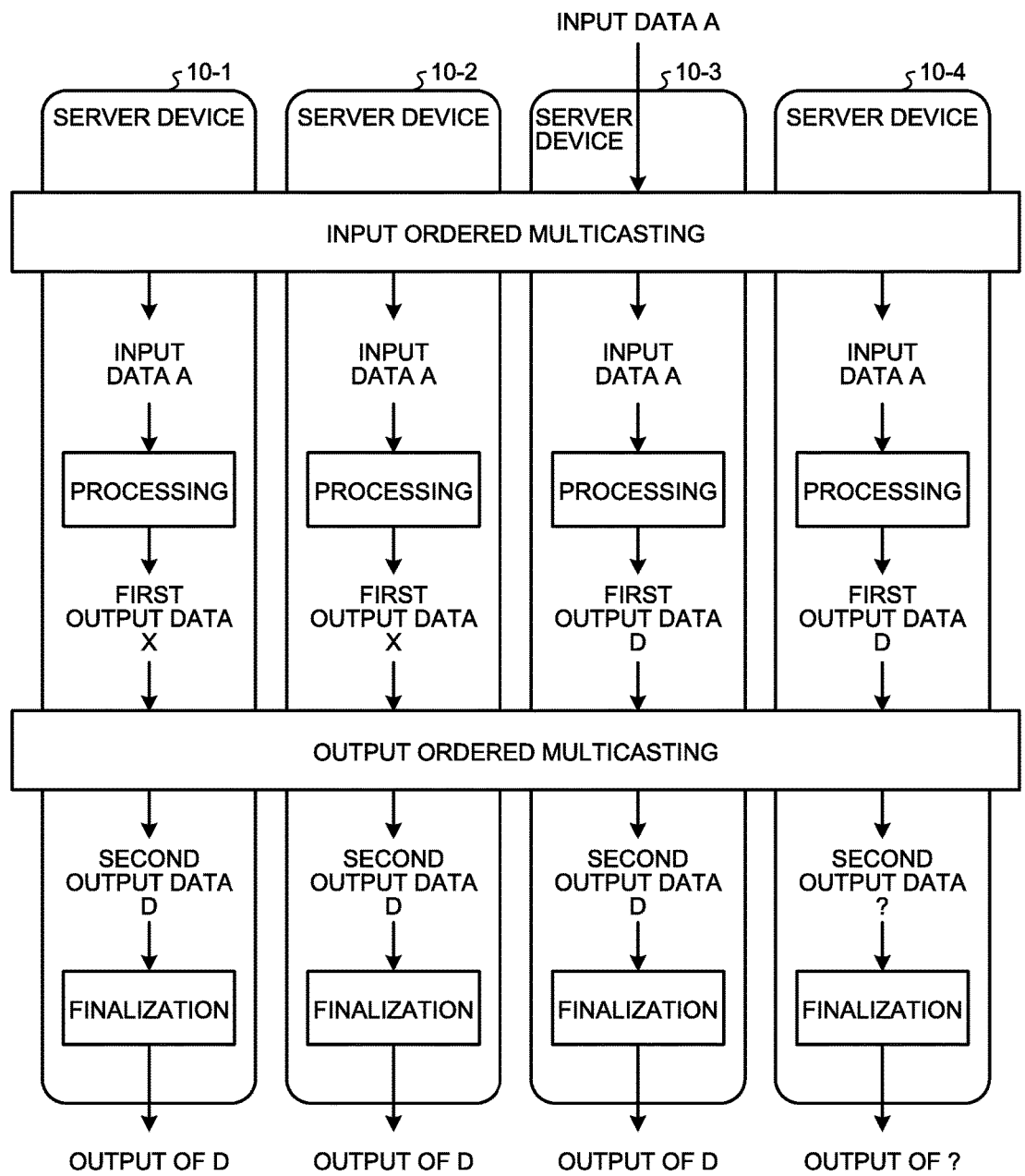
FIG. 7 is a diagram illustrating a second operation example of the multiplexing method according to the first embodiment.

FIG. 7 is a diagram illustrating a second operation example of the multiplexing method according to the first embodiment. FIG. 7 illustrates an example in which the number n of the server devices 10 is equal to four and the number b of occurrences of the byzantine fault is equal to one (i.e., the byzantine fault has occurred in the server device 10-4). In the server device 10-3, when the input unit 101 receives the input data A, the input ordering unit 102 sends the input data A to the server devices 10-1, 10-2, and 10-4. In the server device 10-4, the operations are in an unstable condition because of the byzantine fault. However, with reference to FIG. 7, the explanation is given about an example in which the operations till the operation of outputting first output data D are normally performed in the server device 10-4.

In the server devices 10-1 to 10-4, the input ordering unit 102 associates the input data to the same order number.

In the server devices 10-1 to 10-4, the processing unit 103 performs operations based on the input data A and based on the not-yet-processed internal data stored in the corresponding storage 104, and outputs first output data. In the example illustrated in FIG. 7, the server devices 10-1 and 10-2 output the nondeterministic output data X as the first output data; and the server devices 10-3 and 10-4 output the deterministic output data D as the first output data. Each first output data is stored in the buffer 106 of the corresponding server device 10.

In the server devices 10-1 to 10-3, the output ordering unit 108 decides on the deterministic output data D as the second output data. That is because the deterministic output data D is stored in the buffer 106 of the server devices 10-3 and 10-4, and satisfies the selection condition of the output ordered multicasting because b+1=2 holds true. In the example illustrated in FIG. 7, the nondeterministic output data X too satisfies the selection condition b+1=2 of the output ordered multicasting. However, in this example, the operation of outputting and sending the first output data D was performed earlier, and the first output data D that satisfied earlier the selection condition b+1=2 of the output ordered multicasting was selected.

Meanwhile, although it is assumed that the byzantine fault has occurred in the server device 10-4, there is no way for the server devices 10-1 to 10-3 to get to know that the byzantine fault has occurred in the server device 10-4. Hence, the first output data that is output by the processing unit 103 of the server device 10-4 is treated in an identical manner to the first output data that is output by the processing unit 103 of the normally-operating server devices 10-1 to 10-3.

In the server devices 10-1 and 10-2, the determining unit 109 performs the operations at Steps S11, S13, S14, S15, and S17 and finalizes second output data D as the output of the output unit 112. This exemplary flow of operations represents a case in which, for example, there occurs a temporary shortage of resources in the server devices 10-1 and 10-2, but the shortage is resolved upon re-execution.

The determining unit 109 in the server device 10-3 performs the operations at Steps S11, S13, and S17 and finalizes the second output data D as the output of the output unit 112.

In the server device 10-4, because of the byzantine fault, the output of the output unit 112 is indeterminate.

As a result, even if the server devices 10-1 and 10-2 perform a nondeterministic operation (for example, failure in securing the resources using a system call to the operating system) and even if the server devices 10-3 and 10-4 perform a deterministic operation (successful processing), the consistency of multiplexing is maintained. That is, in the server devices 10-1 to 10-3, the internal data that is stored in the storage 104 is in the state attained after the processing of the input data A. Herein, since the second output data D is a result of a deterministic operation, the internal data that is stored in the storage 104 of the server devices 10-1 to 10-3 also naturally becomes identical.

The two operation examples given above are meant for explaining the operations performed in the multiplexing system 100 according to the embodiment. However, the nondeterministic output data arises only as an exception. Thus, the explanation about the normal operations is given below with reference to FIG. 8.

Figure 8:
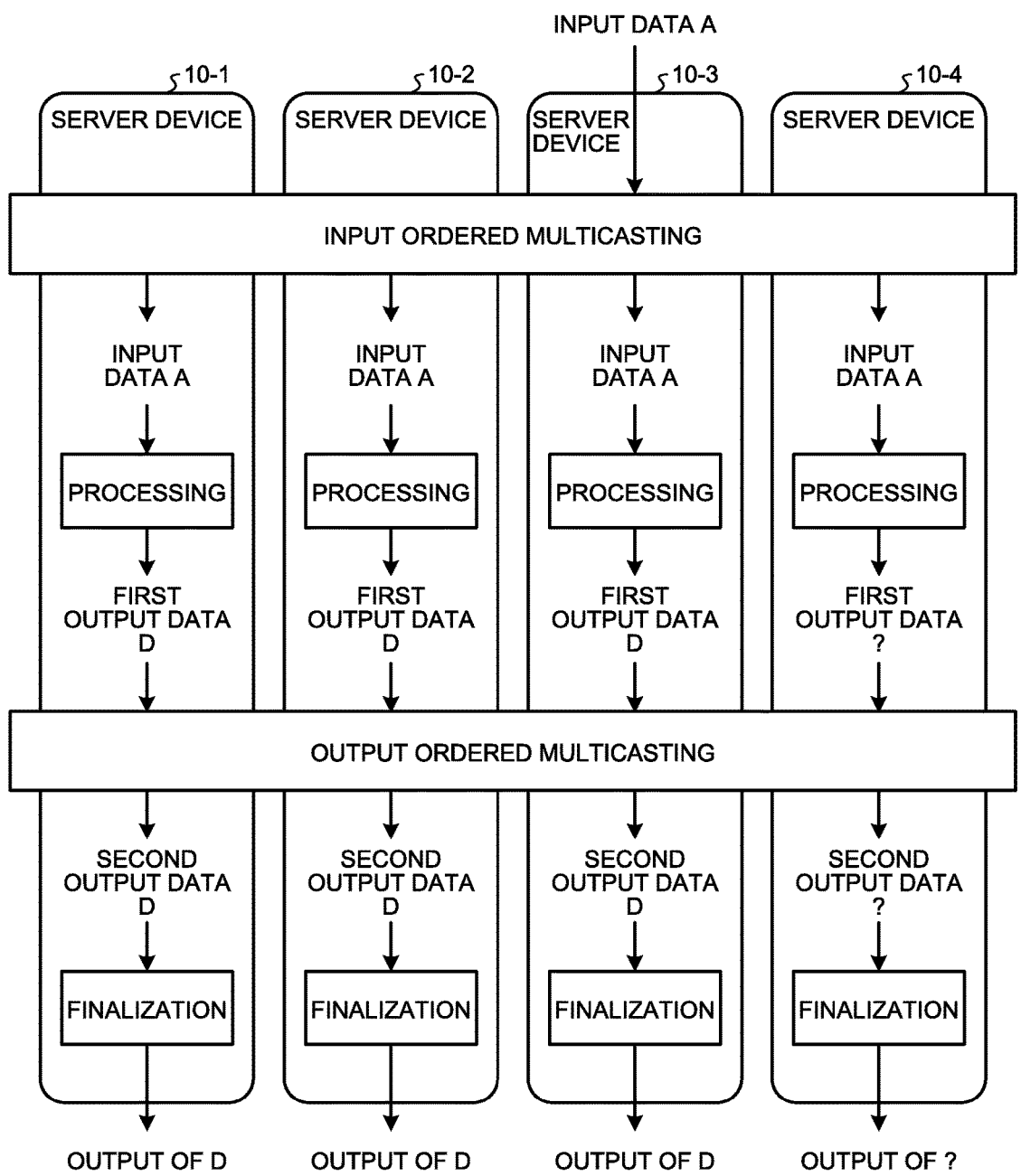
FIG. 8 is a diagram illustrating a third operation example of the multiplexing method according to the first embodiment.

FIG. 8 is a diagram illustrating a third operation example of the multiplexing method according to the first embodiment. FIG. 8 illustrates an example in which the number n of the server devices 10 is equal to four and the number b of occurrences of the byzantine fault is equal to one (i.e., the byzantine fault has occurred in the server device 10-4). In the server device 10-3, when the input unit 101 receives the input data A, the input ordering unit 102 sends the input data A to the server devices 10-1, 10-2, and 10-4. In the server device 10-4, the operations are in an unstable condition because of the byzantine fault.

In the server devices 10-1 to 10-3, the input ordering unit 102 associates the same order number to the input data A.

In the server devices 10-1 to 10-3, the processing unit 103 performs operations based on the input data A and based on the not-yet-processed internal data stored in the corresponding storage 104, and outputs first output data. In the example illustrated in FIG. 8, the server devices 10-1 to 10-3 output the deterministic output data D as the first output data. Each first output data is stored in the buffer 106 of the corresponding server device 10.

In the server devices 10-1 to 10-3, the output ordering unit 108 decides on the deterministic output data D as the second output data. That is because the deterministic output data D is stored in the buffer 106 of the server devices 10-1 to 10-3, and satisfies the selection condition of the output ordered multicasting because b+1=2<3 holds true. Meanwhile, any other first output data ? of the server device 10-4 does not satisfy the selection condition of the output ordered multicasting.

In the server devices 10-1 to 10-3, the determining unit 109 performs the operations at Steps S11, S13, and S17 illustrated in the flowchart in FIG. 5 and finalizes the second output data D as the output of the output unit 112.

As a result, the consistency of multiplexing is maintained in the server devices 10-1 to 10-3. Moreover, as illustrated in the example in FIG. 8, when the nondeterministic output data X is not output in any server devices, the deterministic output data D that is originally supposed to be output gets invariably output.

As explained above, in the multiplexing system 100 according to the first embodiment, the processing unit 103 outputs either deterministic output data or the nondeterministic output data as the first output data. The decision controller 107 (the output ordering unit 108 and the determining unit 109) either selects the first output data output from the processing unit 103 of the own server device 10 or selects the first output data output from the processing unit 103 of another server device 10 other than the own server device 10; and decides the selected first output data to be the second output data. When the second output data is the nondeterministic output data, the restoring unit 105 restores the internal data, which is stored in the storage, to the not-yet-processed state thereof. When the second output data is deterministic output data and when the second output data does not match the first output data output from the own server device 10; either until the second output data matches the first output data output from the own server device 10 or until the re-execution count becomes equal to or greater than a threshold value, the re-execution controller 110 makes the processing unit 103 of the own server device 10 perform operations based on the input data and the not-yet-processed internal data. When the second output data is the nondeterministic output data or when the second output data is deterministic output data and when the second output data matches the first output data output from the own server device 10, the output unit 112 outputs the second output data.

In the multiplexing system 100 according to the first embodiment, for example, even if the processing unit 103 is implemented using a computer program that does not necessarily have determinacy at the time of occurrence of an error such as a shortage of resources, the consistency of multiplexing in the multiplexing system 100 can be maintained. More particularly, when an error operation not having determinacy is to be performed, the computer program meant for implementing the processing unit 103 outputs the nondeterministic output data.

Moreover, in the multiplexing system 100 according to the first embodiment, when there is a shortage of resources in all server devices 10 in regard to a particular input data (for example, when there is an invariable shortage of resources due to the large size of input data); the output of all normal server devices 10 is the nondeterministic output data, and the internal data stored in the storage 104 of all normal server devices 10 is restored to the not-yet-processed state thereof. Herein, it is to be noted that the restored state is not the state of a shortage of resources. As a result, the multiplexing system 100 becomes able to continue with the multiplexing operation. Meanwhile, in the multiplexing operation according to the conventional technology, in the case explained herein, all server devices 10 are treated as if malfunctioning has occurred therein. Hence, the multiplexing operation cannot be continued.

Furthermore, in the multiplexing system 100 according to the first embodiment, regarding a particular input data, when there is no nondeterministic operation such as a shortage of resources occurring in all normal server devices 10 (i.e., in the case of normalcy), the deterministic output data that is originally supposed to be output gets output. Hence, the multiplexing operation can be continued.

Moreover, in the multiplexing system 100 according to the first embodiment, regarding a particular input data, even if there is a mix of the server devices 10 performing nondeterministic operations and having a shortage of resources and the server devices 10 performing deterministic operations, the multiplexing operation can be continued in all server devices 10 (see FIG. 7).

In any case, the multiplexing system 100 according to the first embodiment is characterized by being able to maintain the consistency of multiplexing. Meanwhile, even if a computer within the b number of computers suffers from the byzantine fault, because of the selection condition of the output ordered multicasting, the output of the normal server devices 10 is either deterministic output data or the nondeterministic output data.

Meanwhile, when an additional condition is required as the condition of operation for maintaining the reliability of the input ordered multicasting or the output ordered multicasting, that condition of operation is added to the condition of operation of n>3b. However, regardless of the manner of implementation of the input ordered multicasting and the output ordered multicasting, the multiplexing system 100 according to the first embodiment is effective under that conditions.

Second Embodiment

Given below is the explanation of a second embodiment. In the multiplexing system 100 according to the second embodiment, for example, during the processing of a particular input data, when there is a mix of the server devices 10 having a shortage of resources and the server devices 10 not having a shortage of resources, there is a possibility that the server devices 10 having a shortage of resources are separated from the multiplexing system 100. More particularly, when the re-execution count of the operations performed by the processing unit 103 becomes equal to or greater than a threshold value, the coordination controller 111 terminates the coordination with the other server devices 10 other than the own server device 10.

In the multiplexing system 100 according to the second embodiment, a copying unit 113 is included in place of the coordination controller 111 in the multiplexing system 100 according to the first embodiment. In the explanation of the second embodiment, the identical explanation to that given in the first embodiment is not repeated.

Figure 9:
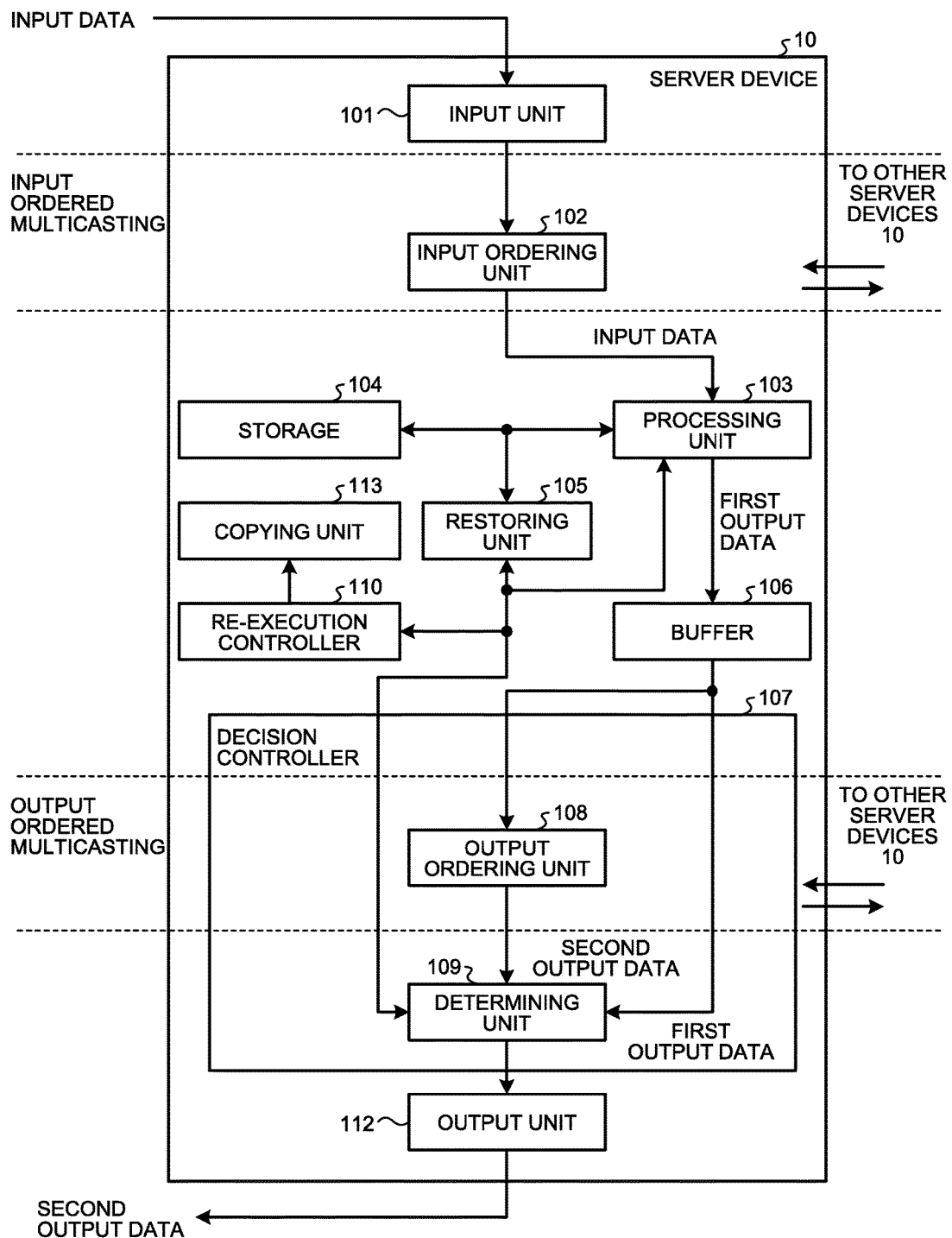
FIG. 9 is a diagram indicating an exemplary configuration of the server device according to a second embodiment.

FIG. 9 is a diagram indicating an exemplary configuration of the server device 10 according to the second embodiment. The server device 10 according to the second embodiment includes the input unit 101, the input ordering unit 102, the processing unit 103, the storage 104, the restoring unit 105, the buffer 106, the decision controller 107, the re-execution controller 110, the output unit 112, and the copying unit 113. The decision controller 107 further includes the output ordering unit 108 and the determining unit 109.

Regarding the condition of operation in the multiplexing system 100 according to the second embodiment, when n represents the number of server devices 10 and when b represents the number of server devices 10 in which the byzantine fault is allowed for maintaining the reliability, n>5b represents the operation of condition. This operation of condition becomes necessary for the copying unit 113 to identify the processed internal data in the corresponding normal server device 10.

Regarding the output ordered multicasting operation performed by the output ordering unit 108, the selection condition is little different than in the first embodiment. In the output ordered multicasting operation, regarding each order number, identical first output data is selected from the buffer 106 of the server devices 10 equal to or greater than 2b+1 in number, and is decided as the second output data. At that time, the output ordered multicasting operation is performed in such a way that the selected second output data matches in each server device.

More particularly, since the n>5b is the condition of operation, the normal server devices 10, excluding the server devices 10 in which the byzantine fault has occurred, are at least equal to 4b+1 in number. If x represents the number of server devices 10 that output the nondeterministic output data as the first output data and if y represents the number of server devices 10 that output deterministic output data as the first output data, then x+y≥4b+1 holds true. Thus, at least either x or y is equal to or greater than 2b+1.

When the re-execution count for which the input data having an order number N is processed by the processing unit 103 becomes equal to or greater than a threshold value; the copying unit 113 copies the processed internal data, which is stored in the storage 104 as a result of the processing of the input data having the order number N by the processing unit 103 of the normal server devices 10, in the storage 104 of the own server device 10. At that time, the copying unit 113 copies the identical internal data, which is stored in the storage 104 of the server devices 10 equal to or greater than b+1 in number, in the storage 104 of the own server device 10.

Figure 10:
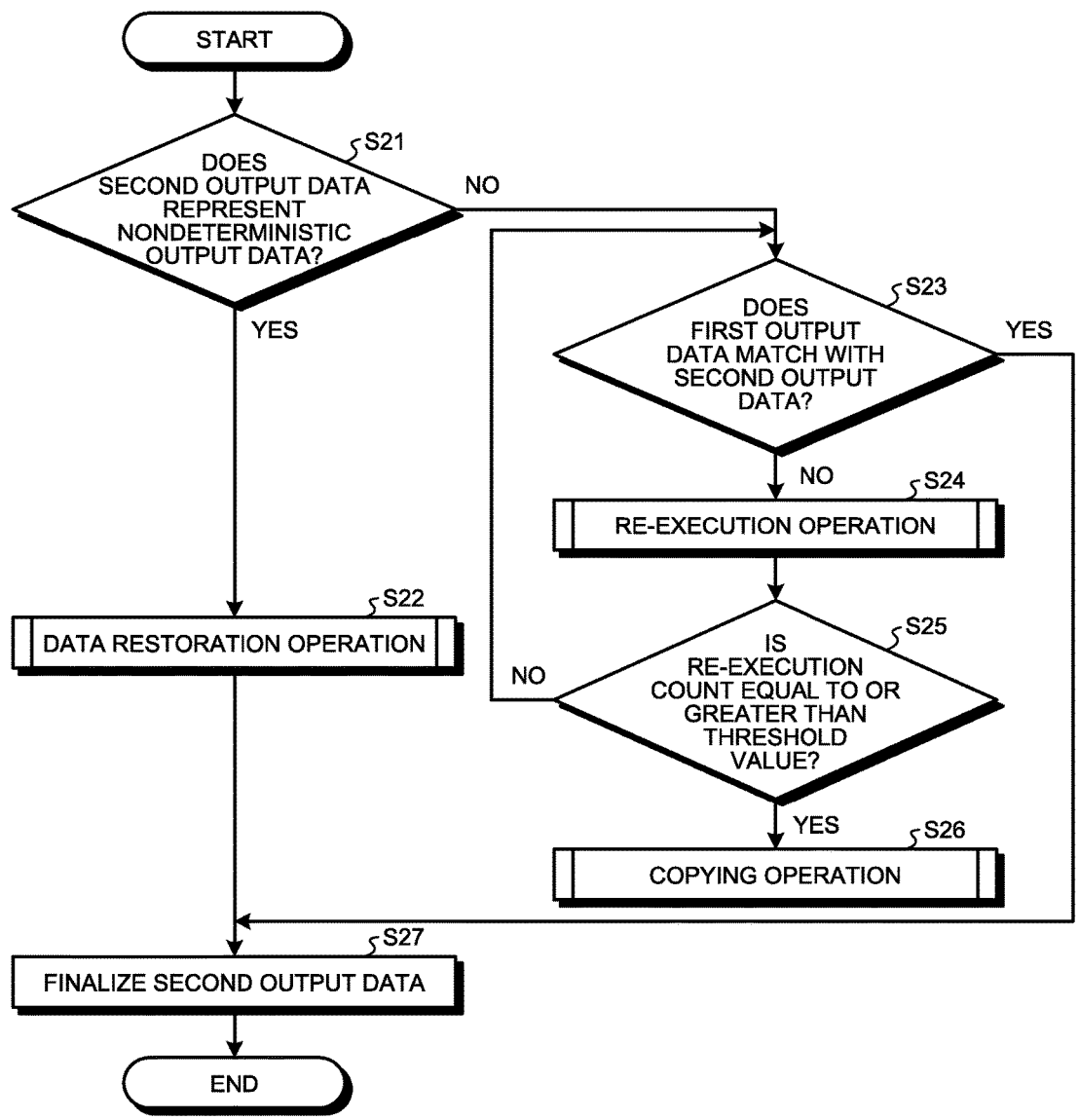
FIG. 10 is a flowchart for explaining an example of a finalization operation according to the second embodiment.

FIG. 10 is a flowchart for explaining an example of the finalization operation according to the second embodiment. As compared to the finalization operation according to the first embodiment, the operation at Step S26 is different. At Step S26, the copying unit 113 performs a copying operation.

The following explanation is about the copying operation performed by the copying unit 113. On the premise of existence of the server device 10 in which the byzantine fault has occurred, it is not possible to identify the server device 10 in which the byzantine fault has occurred. When the re-execution count for which the input data having the order number N is processed by the processing unit 103 becomes equal to or greater than a threshold value; the copying unit 113 has no alternative but to copy the processed internal data, which is stored in the storage 104 as a result of the processing of the input data having the order number N by the processing unit 103 of the normal server devices 10, in the storage 104 of the own server device 10. However, the method for implementing that operation is not trivial. Given below is the explanation of an example of the copying operation performed at Step S26 and the validness of the copying operation. That part represents the characteristic feature of the second embodiment.

Figure 11:
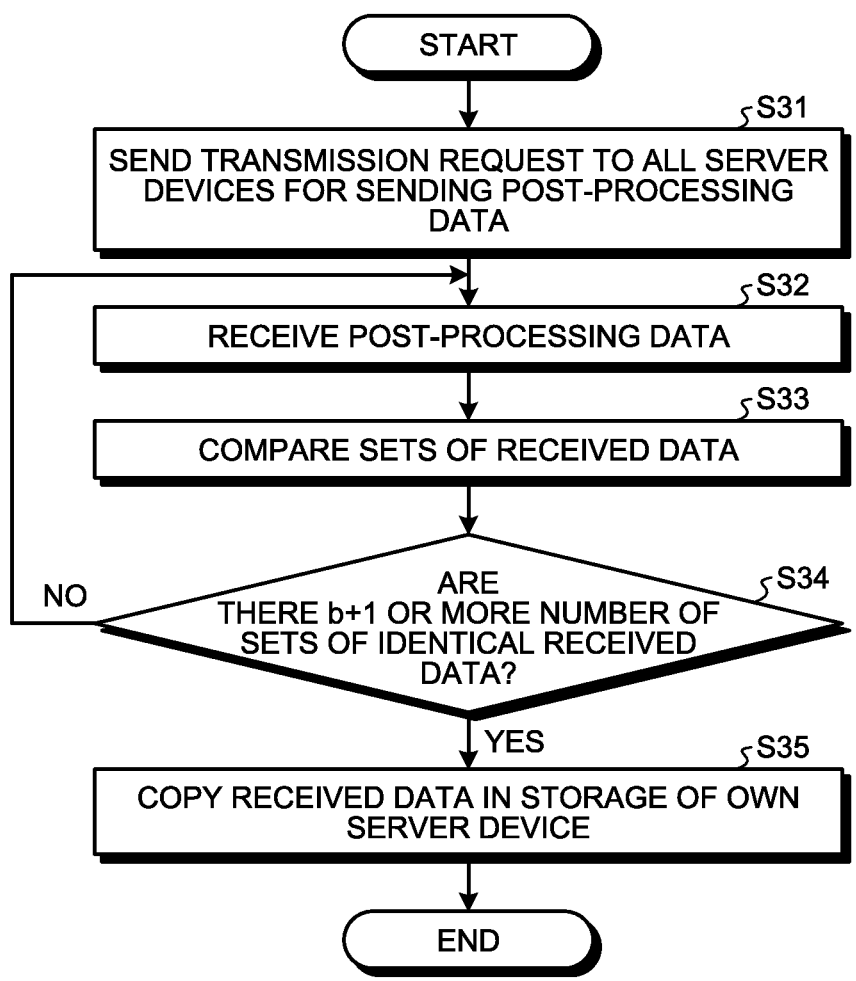
FIG. 11 is a flowchart for explaining an example of a copying operation according to the second embodiment.

FIG. 11 is a flowchart for explaining an example of a copying operation according to the second embodiment. Firstly, when the re-execution count for which the input data having the order number N is processed by the processing unit 103 of the own server device 10 becomes equal to or greater than a threshold value, the copying unit 113 issues a transmission request to all server devices 10 for sending the processed internal data related to the input data having the order number N (Step S31). Upon receiving the transmission request for sending the processed internal data related to the input data having the order number N; each server device 10 that received the request sends back, after the end of the finalization operation therein, the processed internal data that is related to the input data having the order number N and that is stored in the corresponding storage 104.

Thus, from each server device 10 that had received the transmission request for sending the processed internal data related to the input data having the order number N, the copying unit 113 receives the processed internal data related to the input data having the order number N (Step S32). Subsequently, the copying unit 113 compares a plurality of sets of received data (the sets of processed internal data related to the input data having the order number N) received at Step S32 (Step S33).

Subsequently, the copying unit 113 determines whether or not there are b+1 or more number of sets of identical received data (Step S34). If b+1 or more number of sets of identical received data are not present (No at Step S34), then the system control returns to Step S32. When b+1 or more number of sets of identical received data are present (Yes at Step S34), then the copying unit 113 copies that received data in the storage 104 of the own server device 10 (Step S35).

The following explanation is given about the validness of the operations performed at Steps S34 and S35. If the received data having identical contents is obtained from the server devices 10 equal to or greater than b+1 in number, then at least one of the sets of received data is sent from a normal server device 10. Thus, even if the normal server device 10 cannot be identified, it can be said that the received data (the processed internal data related to the input data having the order number N) is correct.

The copying unit 113 performs operations in the case in which the second output data is deterministic output data. That second output data is referred to as the second output data D. Thus, according to the selection condition for the second output data in the output ordered multicasting, the second output data D represents the first output data D obtained as a result of operations performed by the processing unit 103 of the server devices 10 equal to or greater than 2b+1 in number.

Herein, although it is assumed that the number of server devices 10 in which the byzantine fault has occurred is equal to or smaller than b, the number of normal server devices 10 is at least equal to b+1 according to (2b+1)−b. Thus, the number of normal server devices 10 in which the first output data matches the second output data is equal to or greater than b+1.

In the normal server devices 10 in which the first output data matches the second output data, the decision controller 107 (the determining unit 109) can immediately finalize the second output data as the output of the output unit 112. Thus, the normal server devices 10 can respond to a transmission request for sending the processed internal data related to the input data having the order number N. As a result, the server device 10 that issued the transmission request can certainly obtain the processed internal data related to the input data having the order number N from at least b+1 or more number of normal server devices 10. Hence, the algorithm of the copying operation illustrated in FIG. 11 gets completed without fail.

Figure 12:
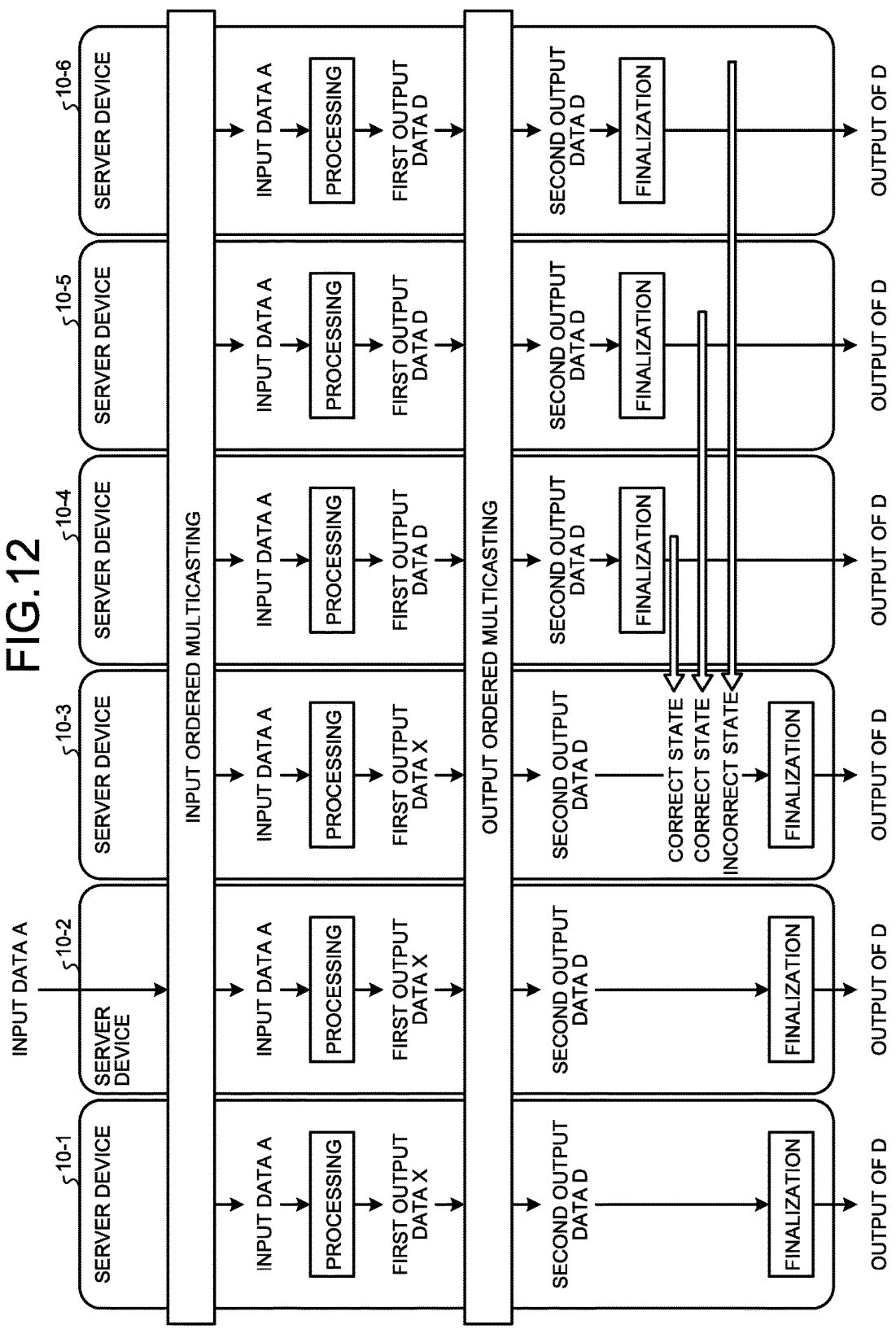
FIG. 12 is a diagram illustrating an operation example of the multiplexing method according to the second embodiment.

FIG. 12 is a diagram illustrating an operation example of the multiplexing method according to the second embodiment. FIG. 12 illustrates an example in which the number n of the server devices 10 is equal to six and the number b of occurrences of the byzantine fault is equal to one (i.e., the byzantine fault has occurred in a server device 10-6). In the server device 10-2, when the input unit 101 receives the input data A, the input ordering unit 102 sends the input data A to the other server devices other than the server device 10-2. In the server device 10-6, the operations are in an unstable condition because of the byzantine fault. However, with reference to FIG. 12, it is assumed that the server device 10-6 is normally operating as far as the processing of the input data A is concerned. In the server devices 10-1 to 10-6, the input ordering unit 102 associates the same order number to the input data A.

In the server devices 10-1 to 10-6, the processing unit 103 performs operations based on the input data A and based on the not-yet-processed internal data stored in the corresponding storage 104, and outputs first output data. In the example illustrated in FIG. 12, the server devices 10-1 to 10-3 output the nondeterministic output data X as the first output data X; and the server devices 10-4 to 10-6 output the deterministic output data D as the first output data D. Each first output data is stored in the buffer 106 of the corresponding server device 10.

In the server devices 10-1 to 10-6, the output ordering unit 108 decides on the deterministic output data D as the second output data. That is because the deterministic output data D is stored in the buffer 106 of the server devices 10-4 to 10-6, and satisfies the selection condition of the output ordered multicasting because 2b+1=3 holds true.

In the example illustrated in FIG. 12, it is illustrated that, in the server devices 10-1 and 10-2, the second output data D is obtained before the re-execution count becomes equal to or greater than the threshold value. Moreover, it is illustrated that, in the server device 10-3, the re-execution count becomes equal to or greater than the threshold value. That is, in the server device 10-3, the copying unit 113 performs the copying operation and copies the processed internal data, which has the identical contents in the server devices 10 equal to or greater than b+1=2 in number, in the corresponding storage 104. Thus, FIG. 12 illustrates an example in which the deterministic output data D is output from the output unit 112 of all server devices 10.

Figure 13:
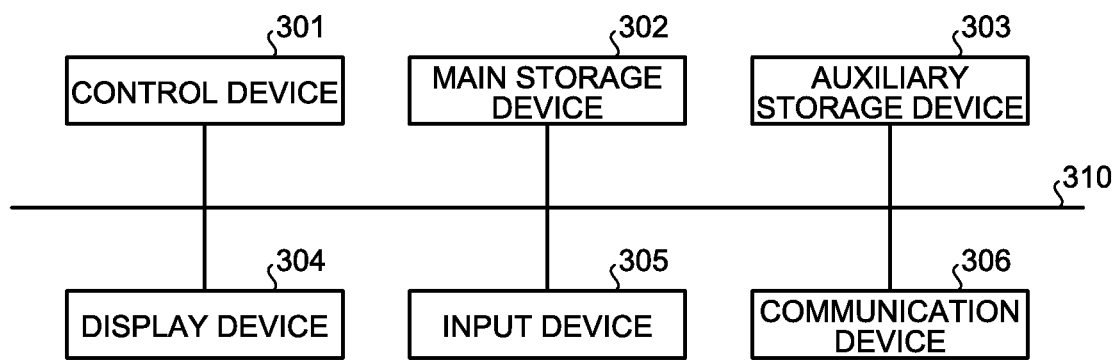
FIG. 13 is a diagram illustrating an exemplary hardware configuration of the server device according to the first and second embodiments.

Lastly, the explanation is given about an exemplary hardware configuration of the server device 10 according to the first and second embodiments. FIG. 13 is a diagram illustrating an exemplary hardware configuration of the server device 10 according to the first and second embodiments. Meanwhile, the client device 20 too has an identical hardware configuration to the server device 10.

The server device 10 according to the first and second embodiments includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected to each other via a bus 310.

The control device 301 executes computer programs that have been read from the auxiliary storage device 303 into the main storage device 302. The main storage device 302 represents a memory such as a read only memory (ROM) or a random access memory (RAM). The auxiliary storage device 303 represents a memory such as a memory card or a solid state drive (SSD).

The display device 304 is used to display information. Examples of the display device 304 include a liquid crystal display. The input device 305 receives input of information. Examples of the input device 305 include a keyboard. Meanwhile, the display device 304 and the input device 305 can be integrated as a liquid crystal touch-sensitive panel having the display function and the input function. The communication device 306 performs communication with other devices.

The computer programs executed in the server device 10 are stored as installable or executable files in a computer-readable storage medium such as a compact disk read only memory (CD-ROM), a memory card, a compact disk readable (CD-R), or a digital versatile disc (DVD); and are provided as a computer program product.

Alternatively, the computer programs executed in the server devices 10 can be stored in a downloadable manner in a computer connected to a network such as the Internet. Still alternatively, the computer programs executed in the server devices 10 can be distributed in a non-downloadable manner via a network such as the Internet.

Still alternatively, the computer programs executed in the server devices 10 can be stored in advance in a ROM.

The computer programs executed in the server device 10 contain modules of the functional blocks that, from among the configuration (functional blocks) of the server device 10 according to the first and second embodiment, can be implemented using computer programs. Herein, examples of the functional blocks that can be implemented using computer programs include the input unit 101, the input ordering unit 102, the processing unit 103, the restoring unit 105, the buffer 106, the decision controller 107 (the output ordering unit 108 and the determining unit 109), the re-execution controller 110, the coordination controller 111, and the output unit 112.

Regarding the functional blocks that can be implemented using computer programs, the control device 301 reads the computer programs from a memory medium such as the auxiliary storage device 303 so that the functional blocks that can be implemented using computer programs are loaded in the main storage device 302. That is, the functional blocks that can be implemented using computer programs are generated in the main storage device 302.

Meanwhile, the functional blocks of the server device 10 according to the first and second embodiments can be implemented using a combination of computer programs and hardware such as an integrated circuit (IC).

As described above, in the multiplexing system 100 according to the second embodiment, the server devices 10 in which the re-execution count becomes equal to or greater than the threshold value need not be separated from the multiplexing system 100 and can be used in the multiplexing operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A multiplexing system comprising a plurality of server devices, wherein
each of the server devices includes
a memory configured to store internal data; and
one or more hardware processors configured to function as a processing unit, a decision controller, a restoring unit, a re-execution controller, and an output unit, wherein
the processing unit is configured to output, as first output data, deterministic output data or the nondeterministic output data, the deterministic output data being uniquely determined by an operation that is based on input data and based on the internal data that has not yet been processed, the nondeterministic output data being output when the processing unit cannot determine the deterministic output,
the decision controller is configured to select either the first output data output from an own server device or the first output data output from one of the other server devices, and decide the selected first output data as second output data,
the restoring unit is configured to, when the second output data is the nondeterministic output data, restore the internal data stored in the memory, to a state of the internal data that has not yet been processed,
the re-execution controller is configured to, when the second output data is deterministic output data and when the second output data does not match the first output data output from the own server device, cause the own server device to repeatedly perform the operation either until the second output data matches the first output data that has been re-decided or until a re-execution count becomes equal to or greater than a threshold value, and
the output unit is configured to output the second output data either when the second output data is the nondeterministic output data or when the second output data is deterministic output data and the second output data matches the first output data that has been re-decided.

2. The system according to claim 1, wherein
the one or more hardware processors further configured to
a coordination controller configured to, when the re-execution count becomes equal to or greater than the threshold value, terminate coordination with the other server devices other than the own server device.

3. The multiplexing system according to claim 1, wherein
the one or more hardware processors further configured to
a copying unit configured to, when the re-execution count becomes equal to or greater than the threshold value, copy, in the memory of the own server device, the internal data that has been processed by the operation performed in another server device, wherein
when the internal data that has been processed is stored in the memory of the own server device, the output unit outputs the second output data.

4. The system according to claim 2, wherein
the number of server devices is represented by an integer n that satisfies n>3b where b is an integer equal to or greater than one, and
the decision controller decides, as the second output data, the first output data that is output by the processing units of the server devices equal to or greater than b+1 in number, where b represents the number of server devices that allow a failure likely to cause malfunctioning to occur.

5. The system according to claim 3, wherein
the number of server devices is represented by an integer n that satisfies n>5b where b is an integer equal to or greater than one, and
the decision controller decides, as the second output data, the first output data that is output by the processing units of the server devices equal to or greater than 2b+1 in number, where b represents the number of server devices that allow a failure likely to cause malfunctioning to occur.

6. The system according to claim 3, wherein
the number of server devices is represented by an integer n that satisfies n>5b where b is an integer equal to or greater than one, and
the copying unit copies, in the memory of the own server device, the internal data that has been processed is identical in the memories of the server devices equal to or greater than b+1 in number, where b represents the number of server devices that allow a failure likely to cause malfunctioning to occur.

7. A multiplexing method implemented in a multiplexing system that includes a plurality of server devices each including a memory for storing internal data, the method comprising:
outputting, as first output data, deterministic output data, deterministic output data or the nondeterministic output data, the deterministic output data being uniquely determined by an operation that is based on input data and based on the internal data that has not yet been processed, the nondeterministic output data being not uniquely determined by the operation;
selecting either the first output data output from a own server device or the first output data output from one of the other server devices;
deciding the selected first output data as second output data;
restoring, when the second output data is the nondeterministic output data, the internal data stored in the corresponding memory, to a state of the internal data that has not yet been processed;
causing, when the second output data is deterministic output data and when the second output data does not match the first output data output from the own server device, the own server device to repeatedly perform the operation either until the second output data matches the first output data that has been re-decided or until a re-execution count becomes equal to or greater than a threshold value; and
outputting the second output data either when the second output data is the nondeterministic output data or when the second output data is deterministic output data and the second output data matches the first output data that has been re-decided.

8. A computer program product having a non-transitory computer readable medium including programmed instructions, wherein the instructions, when executed by a computer of a server device that includes a memory for storing internal data, cause the computer to perform:
outputting, as first output data, deterministic output data, deterministic output data or the nondeterministic output data, the deterministic output data being uniquely determined by an operation that is based on input data and based on the internal data that has not yet been processed, the nondeterministic output data being output when the processing unit cannot determine the deterministic output;

selecting either the first output data output from a own server device or the first output data output from one of the other server devices;

deciding the selected first output data as second output data;

restoring, when the second output data is the nondeterministic output data, the internal data stored in the corresponding memory, to a state of the internal data that has not yet been processed;

causing, when the second output data is deterministic output data and when the second output data does not match the first output data output from the own server device, the own server device to repeatedly perform the operation either until the second output data matches the first output data that has been re-decided or until a re-execution count becomes equal to or greater than a threshold value; and outputting the second output data either when the second output data is the nondeterministic output data or when the second output data is deterministic output data and the second output data matches the first output data that has been re-decided.

* * * * *